US007537399B2

United States Patent
Mayumi

(10) Patent No.: US 7,537,399 B2
(45) Date of Patent: May 26, 2009

(54) DIGITAL CAMERA HAVING CAMERA BODY

(75) Inventor: Kazuya Mayumi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 349 days.

(21) Appl. No.: 11/638,566

(22) Filed: Dec. 14, 2006

(65) Prior Publication Data

US 2007/0133977 A1    Jun. 14, 2007

(30) Foreign Application Priority Data

Dec. 14, 2005    (JP) ............................. 2005-360308

(51) Int. Cl.
*G03B 17/04* (2006.01)
(52) U.S. Cl. ...................... 396/348; 396/535; 396/541; 348/360; 348/373
(58) Field of Classification Search ................ 396/286, 396/345, 348–350, 535, 536, 541; 348/373, 348/375, 376, 360
See application file for complete search history.

(56) References Cited

U.S. PATENT DOCUMENTS 2,495,223 A * 1/1950 Bodlander .................. 396/348
5,640,641 A * 6/1997 Balling ....................... 396/535
6,742,943 B2   6/2004 Ushiro
7,106,959 B2 * 9/2006 Sato ............................. 396/27
7,331,724 B2 * 2/2008 Hasegawa et al. ........... 396/348
7,433,722 B2 * 10/2008 Sakamoto et al. ......... 455/575.3

FOREIGN PATENT DOCUMENTS

JP     2004-109970 A    4/2004

* cited by examiner

*Primary Examiner*—W. B. Perkey
*Assistant Examiner*—Bret Adams
(74) *Attorney, Agent, or Firm*—Sughrue Mion, PLLC

(57) ABSTRACT

A digital still camera includes a lens mount mechanism, positioned on a front face of a camera body, for securing a lens assembly to the camera body removably. A door shaped cover is secured to the camera body, and shiftable between first and second positions while the lens assembly is removed. The door shaped cover, when in the first position, is closed on the front face to cover the lens mount mechanism, and when in the second position, is open from the front face to allow loading of the lens assembly and to operate as a grip. A flexible pad sheet of rubber is deformable resiliently when the door shaped cover is retained in the first position by a retaining mechanism, for tightly closing between the front face and a cover inner surface of the door shaped cover opposed to the front face.

17 Claims, 4 Drawing Sheets

DIGITAL CAMERA HAVING CAMERA BODY

BACKGROUND OF THE INVENTION

1. Field of the Invention

The present invention relates to a digital camera having a camera body. More particularly, the present invention relates to a digital camera, in which a lens assembly is connectable with a camera body, and a lens mount mechanism of the camera body can be protected from dust, liquid or other foreign material.

2. Description Related to the Prior Art

A digital still camera is known in the field of optical instruments. A CCD image sensor as image pickup device records an image of an object to generate image data by digital conversion. Image data is written to a built-in memory or a memory card as external storage medium. U.S. Pat. No. 6,742,943 (corresponding to JP-A 2004-109970) discloses one example of the digital still camera in which a lens assembly is used as an exchange lens for focusing an object image of the CCD image sensor. A selected one of plural types of exchange lenses can be used according to intention of a user, for example wide-angle lens or telephoto lens.

In a lens exchange type of the digital still camera, it is likely that dust, liquid or the lid may enter a camera body through a lens mount mechanism for the lens assembly. If foreign material enters the camera body, it may stick on the CCD image sensor and create a portion of dirt in an image, or cause difficulty or damage in the operation of the camera body. In view of this, U.S. Pat. No. 6,742,943 (corresponding to JP-A 2004-109970) discloses an openable cover for closing an opening of the lens mount mechanism while the lens assembly is removed. Entry of dust or the like is prevented through the lens mount mechanism.

However, the cover disclosed in the document opens and closes the opening of the lens mount mechanism by simply sliding or rotating a panel shaped device as the cover. There is no suggested prevention of entry of liquid. It is conceivable to use a removable cap, associated with the lens mount mechanism, for covering and closing the opening in a fluid tight manner. However, there arises a problem in low operability of the digital still camera because of complicated operation for loading and unloading the cap.

SUMMARY OF THE INVENTION

In view of the foregoing problems, an object of the present invention is to provide a digital camera, in which a lens assembly is connectable with a camera body, and a lens mount mechanism of the camera body can be protected from dust, liquid or other foreign material.

In order to achieve the above and other objects and advantages of this invention, a digital camera includes a camera body, a lens assembly having a photographing lens, and a lens mount mechanism, positioned on a front face of the camera body, for securing the lens assembly to the camera body removably. The digital camera includes a grip cover portion secured to the camera body, and shiftable between first and second positions while the lens assembly is removed, the cover portion, when in the first position, being opposed to the front face to cover the lens mount mechanism, and when in the second position, being open from the front face to allow loading of the lens assembly. A retaining mechanism retains the cover portion in the first position. A resilient pad material is deformable resiliently when the cover portion is retained in the first position by the retaining mechanism, for tightly closing between the front face and a cover inner surface of the cover portion opposed to the front face.

The cover portion is a grip portion to operate for externally supporting the camera body during photography.

Furthermore, a hinge mechanism connects said cover portion with said camera body in a rotatable manner.

The hinge mechanism has a rotational axis extending vertically.

The pad material is secured to the cover inner surface.

The pad material extends in a belt shape and is disposed about the cover portion.

Furthermore, an opening is formed through the pad material and positioned at the cover inner surface, wherein an edge of the opening is disposed about the lens mount mechanism.

At least one of the front face and the cover inner surface has an externally operable input unit for inputting a signal to the camera body.

At least one of the front face and the cover inner surface has a light source for emitting light of signaling.

At least one of the front face and the cover inner surface has a through hole. A sound source is contained in a region in a space inside the through hole, for generating source of signaling.

Furthermore, an input panel is disposed on the cover inner surface, and having a plurality of the operable input unit.

The pad material is secured to the front face.

Furthermore, an opening is formed through the pad material and positioned at the front face, wherein an edge of the opening is disposed about the lens mount mechanism.

The pad material is disposed about the lens mount mechanism, and when the cover portion is in the second position, is further deformed resiliently by contact with the lens assembly.

The cover inner surface has a form of a mirror surface.

Furthermore, a receiving recess is formed in the camera body at the first end. A projection is formed to project from the cover portion at the second end, and inserted in the receiving recess. The hinge mechanism keeps the projection rotatable at the receiving recess.

The lens assembly includes an image pickup device for receiving object light focused thereon from the photographing lens, and for generating image data by photoelectric conversion.

The pad material is formed from rubber or elastomer.

In one preferred embodiment, a digital camera includes a camera body, a lens assembly having a photographing lens, and a lens mount mechanism, positioned on a front face of the camera body, for securing the lens assembly to the camera body removably. The digital camera includes a grip portion, secured to the camera body, and shiftable between first and second positions while the lens assembly is removed, the grip portion, when in the first position, being closed on the front face to grip portion the lens mount mechanism, and when in the second position, being open from the front face to allow loading of the lens assembly. A retaining mechanism retains the grip portion in the first position. A resilient pad material is deformable resiliently when the grip portion is retained in the first position by the retaining mechanism, for tightly closing between the front face and a cover inner surface of the grip portion opposed to the front face.

The camera body has a first end, and the grip portion has a second end. Furthermore, a hinge mechanism connects the second end with the first end in a rotatable manner.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
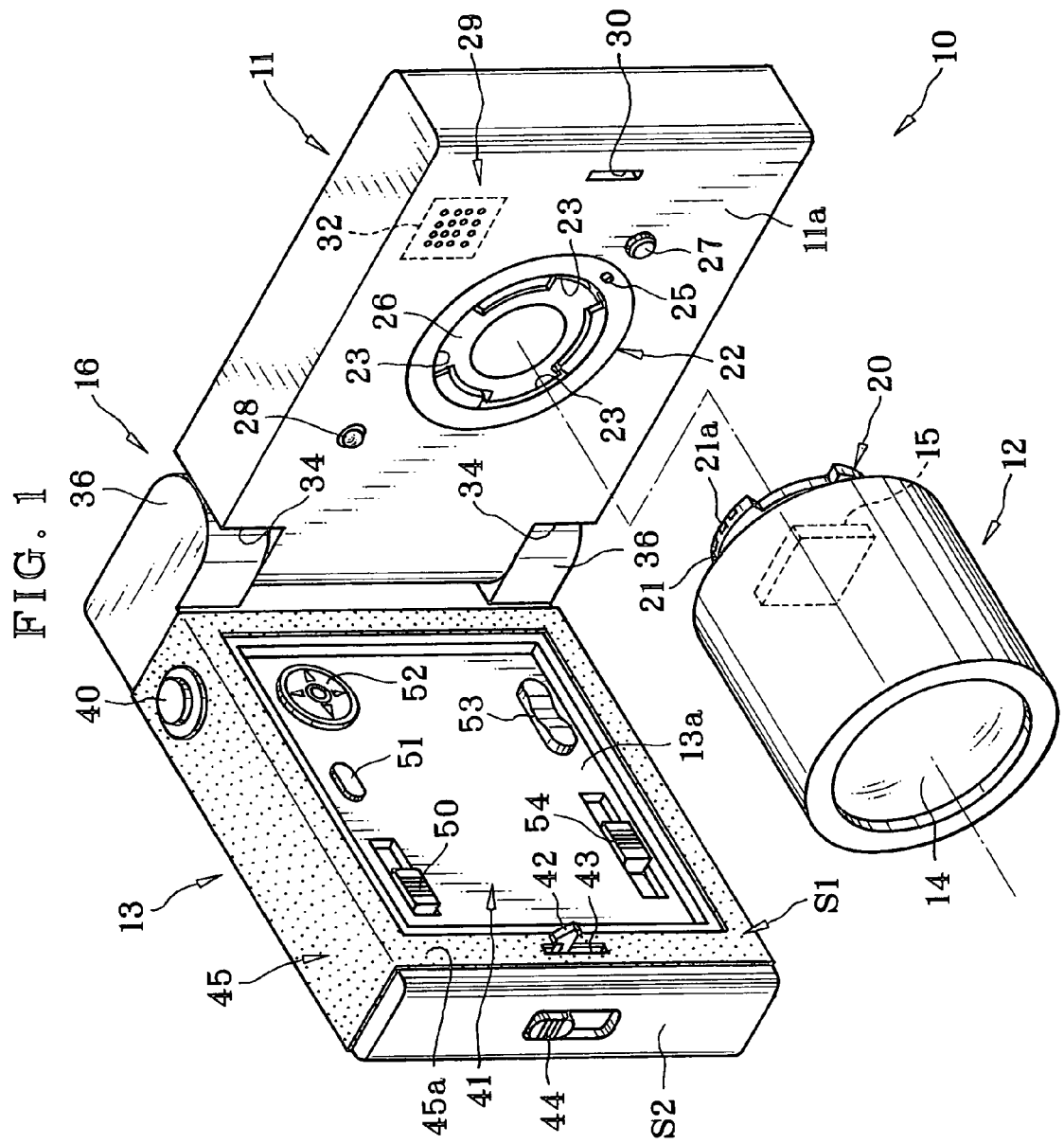
FIG. 1 is a perspective view illustrating a digital still camera.

In FIG. 1, a digital still camera 10 is illustrated. The digital still camera 10 includes a camera body 11, a lens assembly 12, and a door shaped cover 13 or grip. The lens assembly 12 includes a photographing lens 14 and a CCD image sensor 15 or image pickup device. Object light is passed through the photographing lens 14, and is focused on the CCD image sensor 15 for photoelectric conversion. The camera body 11 of the box shape supports the lens assembly 12 in a removable manner. Various control signals are transmitted to and received from the lens assembly 12, so the CCD image sensor 15 is driven to acquire image data of a digital form according to an object image.

The door shaped cover 13 has a shape of a rectangular quadrilateral, and has a small thickness in a manner similar to the camera body 11, and becomes grasped by a user to take a photograph. A hinge mechanism 16 is disposed in a receiving recess 34 on a right end of the camera body 11, and keeps the door shaped cover 13 rotatable on the camera body 11 about an axis extending vertically.

The lens assembly 12 is a selected one of plural exchangeable lens assemblies, including lenses of different focal lengths in the photographing lens 14, lenses of different numbers of pixels in the CCD image sensor 15, a lens adapted to monochromatic photography, and a lens adapted to infrared photography. Selective use of the lens assembly 12 with the camera body 11 in the digital still camera 10 makes it possible to acquire image data easily in any of various scenes.

A coupling mechanism 20 is disposed on the rear face of the lens assembly 12. Bayonet lugs 21 in the coupling mechanism 20 are formed to protrude. A front face 11a of the camera body 11 confronts with the coupling mechanism 20. A lens mount mechanism 22 is disposed on the front face 11a. Bayonet channels 23 are formed in the lens mount mechanism 22. For coupling, at first the bayonet lugs 21 are positioned at and inserted in the bayonet channels 23, and then are rotated in the clockwise direction to fit the coupling mechanism 20 on the lens mount mechanism 22. Also, plural electric contacts 21a are formed in the bayonet lugs 21. When the bayonet lugs 21 are inserted in the bayonet channels 23, the electric contacts 21a are connected with contacts (not shown) disposed in the bayonet channels 23. Thus, the lens assembly 12 is connected with the camera body 11 mechanically by association of the bayonet lugs 21 and the bayonet channels 23 and also electrically by fitting of the contacts in the coupling mechanism 20 and the lens mount mechanism 22.

A lock pin 25 and a protector or lid 26 are incorporated in the lens mount mechanism 22. When the lens assembly 12 is connected with the camera body 11, an engaging hole (not shown) in the coupling mechanism 20 receives the lock pin 25 to block rotation of the lens assembly 12. The lens assembly 12 is kept connected tightly with the camera body 11 without a drop. A spring biases the protector 26 toward the front. When the lens assembly 12 is not coupled, the protector 26 closes the opening for the bayonet lugs 21 from the inside, to prevent entry of dust or the like into the camera body 11.

The camera body 11 of the digital still camera 10 is provided with an unlocking pin 27, a light source 28 and a number of through holes 29 as well as the lens mount mechanism 22. The unlocking pin 27 is depressible to disengage the lock pin 25. The light source 28 illuminates with light to inform a person as an object to be photographed about a state of completion of photographing. The through holes 29 are formed to pass air to transmit sound to or from the camera body 11. When the unlocking pin 27 is depressed, the lock pin 25 moves back into the camera body 11 responsively, and becomes disengaged from a hole. The lens assembly 12 is allowed again to rotate, and become removable from the camera body 11. A sound source 32 and a sound condensing microphone (not shown) are incorporated in the camera body 11 and positioned behind the through holes 29. The sound source 32 emits sound for passage through the through holes 29. Also, the microphone collects sound passed through the through holes 29.

Figure 2:
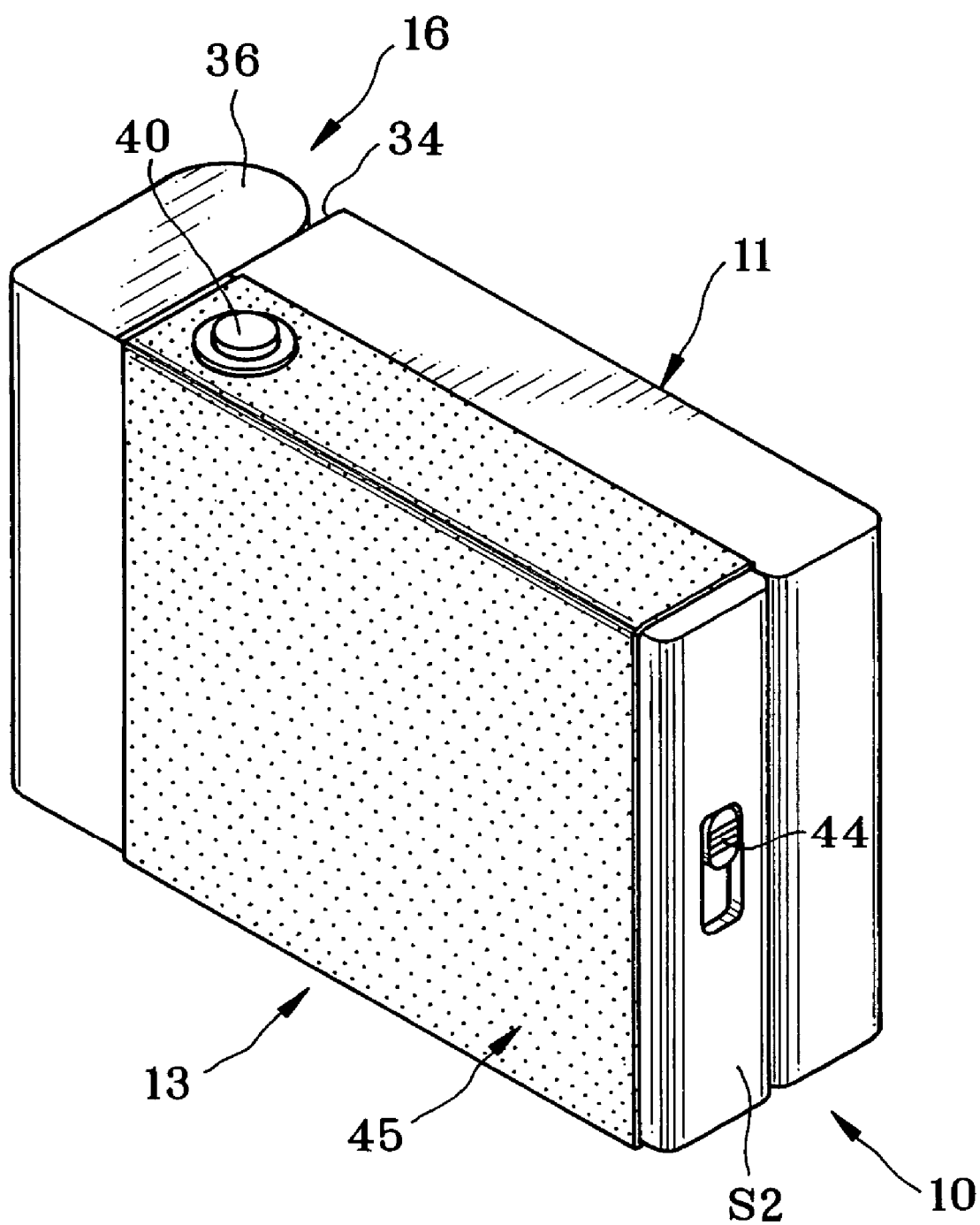
FIG. 2 is a perspective view illustrating the digital still camera in a closed state of a door shaped cover, namely in a first position.

The door shaped cover 13 or grip is pivotally movable on the camera body 11 between a first position or cover position, and a second position or grip position. The door shaped cover 13, when in the second position of FIG. 1, operates as a grip in uncovering the lens mount mechanism 22, and when in the first position of FIG. 2, covers the front face 11a of the camera body 11 in an ineffective state without the lens assembly 12 to protect the lens mount mechanism 22.

A shutter button 40 is disposed on an upper surface of the door shaped cover 13 or grip for triggering photographing operation into the digital still camera 10. The shutter button 40 is a switch of a two step depressible structure. When the shutter button 40 is halfway depressed, a first step switch is turned on, so the digital still camera 10 operates for the AF and AE operation to stand by for image pickup. When the shutter button 40 is fully depressed, a second step switch is turned on. An image signal of one image frame in a state ready for photographing is converted to image data. Also, upon the full depression, the light source 28 is turned on to inform a person as an object of the photographing operation.

A cover inner surface S1 of the door shaped cover 13 or grip faces on the front face 11a of the camera body 11 when in the first position. An input panel 41 or user interface and a retention hook 42 or retention mechanism are disposed on the cover inner surface S1. The input panel 41 is operable to input command signals for various instructions to the camera body 11. The retention hook 42 is engageable for keeping the door shaped cover 13 in the first position. A cover inner surface 13a of the door shaped cover 13 is deeper than a peripheral region of the door shaped cover 13, and has the input panel 41 in a manner without interference with the lens mount mechanism 22 even upon shifting to the first position. The input panel 41 includes a power button 50, a menu button 51, a cross shaped key 52, and a zoom button 53 as input units in a user interface. The power button 50 turns on and off the power for the digital still camera 10. The menu button 51 is associated with an LCD display panel (not shown) on the rear of the camera body 11, and causes the display panel to display a menu screen region or is operable for determining a selectively designated item. The cross shaped key 52 shifts a cursor in the menu screen region. The zoom button 53 moves the photographing lens 14 in zoom directions toward the wide-angle end and toward the telephoto wide.

Selectable modes of the digital still camera 10 include a still image pickup mode, a motion picture pickup mode, and a playback mode. A mode selector 54 as input unit in a user interface in the input panel 41 is operable to set a selected one of those modes. There is a connector, such as a flexible wiring board, extending through the hinge mechanism 16, for electrically connecting circuits of the door shaped cover 13 or grip with circuits of the camera body 11, for the purpose of communication to transmit command signals to the camera body 11 from the buttons in the input panel 41.

A channel 43 is formed to extend vertically, and supports the retention hook 42 movably in a vertically direction on the door shaped cover 13 or grip. The retention hook 42 is biased up vertically by a spring (not shown), and kept in the position of FIG. 1. A retention channel 30 in a retention mechanism is formed in the front face 11a of the camera body 11. The retention hook 42 is so positioned that an inclined edge of the retention hook 42 comes to face an upper end of the retention channel 30 when the door shaped cover 13 pivotally moves to the first position. The retention hook 42 is pressed down by contact of an upper end of an inclined edge, and enters the camera body 11, and becomes engaged with the retention channel 30 to keep the door shaped cover 13 in the first position. A combination of the retention hook 42 with the retention channel 30 is a fastener. Note that any suitable form of mechanism known in the art can be used as fastener. Also, it is preferable that a click mechanism (not shown) is added to the hinge mechanism 16 at the receiving recess 34 or a projection 36, to retain the door shaped cover 13 lightly in the second position.

A sliding button 44 is disposed on a lateral face S2 of the door shaped cover 13 or grip for disengaging the retention hook 42 from the retention channel 30. A spring (not shown) biases the sliding button 44 in an upward direction. Also, the sliding button 44 is connected with the retention hook 42 in the door shaped cover 13. The retention hook 42 is pressed down in response to pressing down the sliding button 44, for disengagement from the retention channel 30. In other words, the door shaped cover 13 is rotationally shifted to open while the sliding button 44 is depressed in order to shift the door shaped cover 13 to the second position from the first position.

A belt shaped flexible pad sheet 45 as pad material or packing material is wound about the door shaped cover 13 or grip, and fitted on two lateral faces and upper and lower faces thereof. Openings are formed in the pad sheet 45 to allow access to the shutter button 40, the input panel 41 and the channel 43. A sheet portion 45a is fitted on the cover inner surface S1, and is in a frame shape defined by the form of the quadrilateral opening. The sheet portion 45a, when the door shaped cover 13 moves to the first position, contacts the front face 11a of the camera body 11 in the region about the lens mount mechanism 22 and the through holes 29, and becomes collapsed by the camera body 11 and the door shaped cover 13, to tighten the contact between the front face 11a and the cover inner surface S1. Preferred examples of materials of the pad sheet 45 are natural rubber, elastomer containing silicone, synthetic rubber, or the like. Any suitable material known in the field of packing is available. Furthermore, porous material may be used as the pad sheet 45.

The operation of the digital still camera 10 is described now. The lens assembly 12 is originally separate from the camera body 11 of the digital still camera 10, to preserve the camera body 11 and the lens assembly 12 discretely. For the preservation, the door shaped cover 13 is shifted to the first position of FIG. 2. The door shaped cover 13 upon the shifting is kept in the first position by engagement of the retention hook 42 and the retention channel 30. The sheet portion 45a of the pad sheet 45 is resiliently deformed by the camera body 11 and the door shaped cover 13, to tighten the contact between the front face 11a of the camera body 11 and the cover inner surface S1 of the door shaped cover 13 without a space. Therefore, liquid, dust or other unwanted material can be prevented from entry in the camera body 11 through the lens mount mechanism 22.

Openings are required in surfaces of the camera body 11 and the door shaped cover 13 or grip in view of disposing the light source 28, the through holes 29 and buttons of the input panel 41. An open state of the openings should be considered to prevent entry of unwanted material. However, the input panel 41 of the digital still camera 10 is disposed on the cover inner surface S1. The light source 28 and the through holes 29 are disposed on the front face 11a. The sheet portion 45a of the pad sheet 45 extends in a frame shape to surround those devices. Thus, entry of foreign material can be prevented at the input panel 41 and the through holes 29. Note that an opening other than such examples may be formed in the front face 11a or the cover inner surface S1, namely, a chamber for a battery, a card slot for a memory card, a connection terminal for external connection.

The use of the pad sheet 45 also prevents direct contact of the front face 11a and the cover inner surface S1, so as to prevent scratches on those surfaces. Should the door shaped cover 13 or grip move abruptly to the first position in an incidental situation, the pad sheet 45 can absorb shock of the door shaped cover 13, to protect the door shaped cover 13 from damages or scratches.

In general, it is likely that the photographing lens 14 is influenced by changes in humidity. It is recommended to preserve the photographing lens 14 in an environmental condition of administered humidity for the purpose of preventing growth of mold or microbes, or preventing drying of oil. When the lens assembly 12 is separated form the camera body 11, those can be preserved in different environmental conditions suitably determined. This is advantageous in suitable preservation of the lens assembly 12. When the digital still camera 10 is carried by a user with the lens assembly 12 fitted on the camera body 11, incidental shock may cause damages to the coupling mechanism 20 or the lens mount mechanism 22. However, it is possible in the digital still camera 10 of the invention to prevent entry of dust into the camera body 11 even while the lens assembly 12 is removed. The coupling mechanism 20 and the lens mount mechanism 22 can be prevented from damages by separate preservation of the camera body 11 and the lens assembly 12.

To take an exposure in the digital still camera 10, at first the door shaped cover 13 or grip is rotated about the hinge mechanism 16 while the sliding button 44 is kept pressed down. The door shaped cover 13 is rotated from the first position to the second position. In the embodiment, the second position is defined at 90 degrees of a rotational angle from the first position. However, an angle at which the second position is defined may be any suitable value such that the lens mount mechanism 22 appears to enable securing of the lens assembly 12.

After the door shaped cover 13 or grip is shifted to the second position, the lens assembly 12 is secured to the camera body 11 by engagement between the coupling mechanism 20 and the lens mount mechanism 22, so the digital still camera 10 becomes ready for use. As the protector 26 closes the lens mount mechanism 22, entry of dust or foreign material to the camera body 11 is prevented before the lens assembly 12 is fitted. After securing the lens assembly 12, the power button 50 is operated to supply power. The digital still camera 10 is started up in a mode determined by use of the mode selector 54. A still image or a motion picture is recorded by photographing according to a set position of the mode selector 54.

Thus, unfolding of the door shaped cover 13 or grip is at the same time as uncovering the lens mount mechanism 22 in the digital still camera 10. This can result in higher operability than widely used examples in which a removable cap is fitted on the lens mount mechanism 22. There is no fear of losing the cap accidentally. There has been a recent tendency of reducing the size of the camera and enlarging the size of the LCD. Suitability for manual holding is likely to be lower because of this tendency. However, the door shaped cover 13 in the second position can be grasped by a user firmly, to raise the suitability for manual holding of the digital still camera 10. When the door shaped cover 13 is in the first position, the door shaped cover 13 is superimposed on the camera body 11 in a flattened manner of the thin box shape. This is consistency with the desired reduction of the size of the digital still camera 10.

The pad sheet 45, disposed about the door shaped cover 13 or grip, can be manually grasped in an ensured manner because a hand of a user can touch the pad sheet 45 in a flexible manner by the resilient deformation. Holding of the door shaped cover 13 can be tight because slip of fingers or a hand can be prevented. In the embodiment, the shutter button 40 is disposed on an upper surface of the door shaped cover 13. The zoom button 53 and the mode selector 54 are disposed in a lower portion of the cover inner surface 13a for easy access in photographing. When a right hand supports the door shaped cover 13, its index finger can touch and operate the shutter button 40. A thumb of the hand can operate the zoom button 53 and the mode selector 54. A photograph can be taken easily while the door shaped cover 13 is manually held. Note that the disposition of the shutter button 40 and the input panel 41 is not limited to that being depicted. It is possible to dispose the shutter button 40 or the input panel 41 on other surfaces, for example the rear face of the camera body 11.

Figure 3:
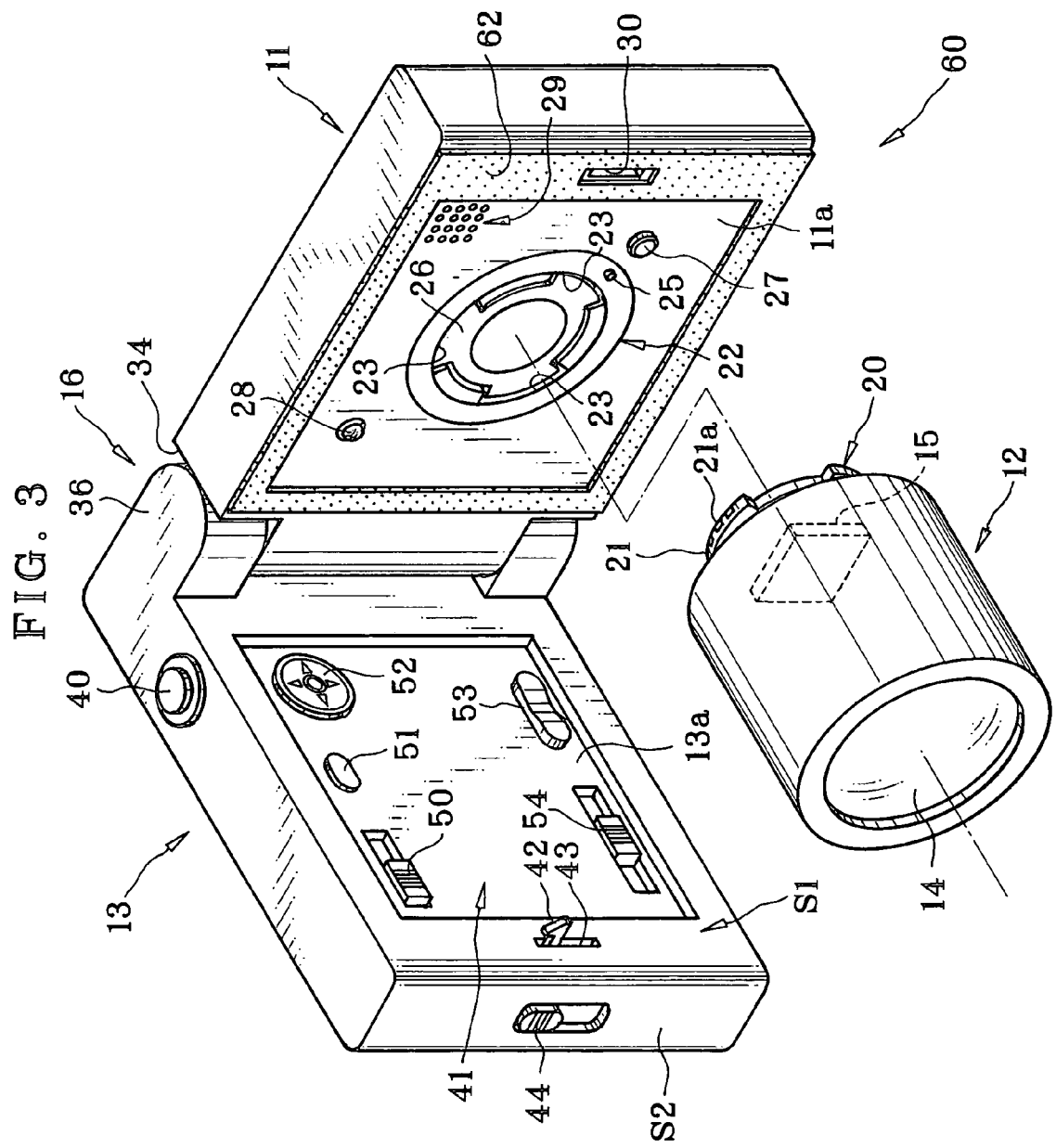
FIG. 3 is a perspective view illustrating one preferred digital still camera in which a flexible pad sheet is disposed on a camera body.

In the above embodiment, the pad sheet 45 is disposed about the door shaped cover 13 or grip. However, covering of only the sheet portion 45a is sufficient for protecting the lens mount mechanism 22 from liquid, dust or the like in view of contact of the cover inner surface S1 with the front face 11a. In FIG. 3, one preferred digital still camera 60 is illustrated, in which a frame shaped flexible pad sheet 62 as pad material or packing material is attached to the camera body 11 instead of the door shaped cover 13. The pad sheet 62 is fitted on the front face 11a and disposed to surround the light source 28, the through holes 29 and a region of the input panel 41. When the door shaped cover 13 pivotally moves to the first position, the pad sheet 62 is collapsed resiliently and contacts the cover inner surface S1 in a tightly fitted manner.

Figure 4:
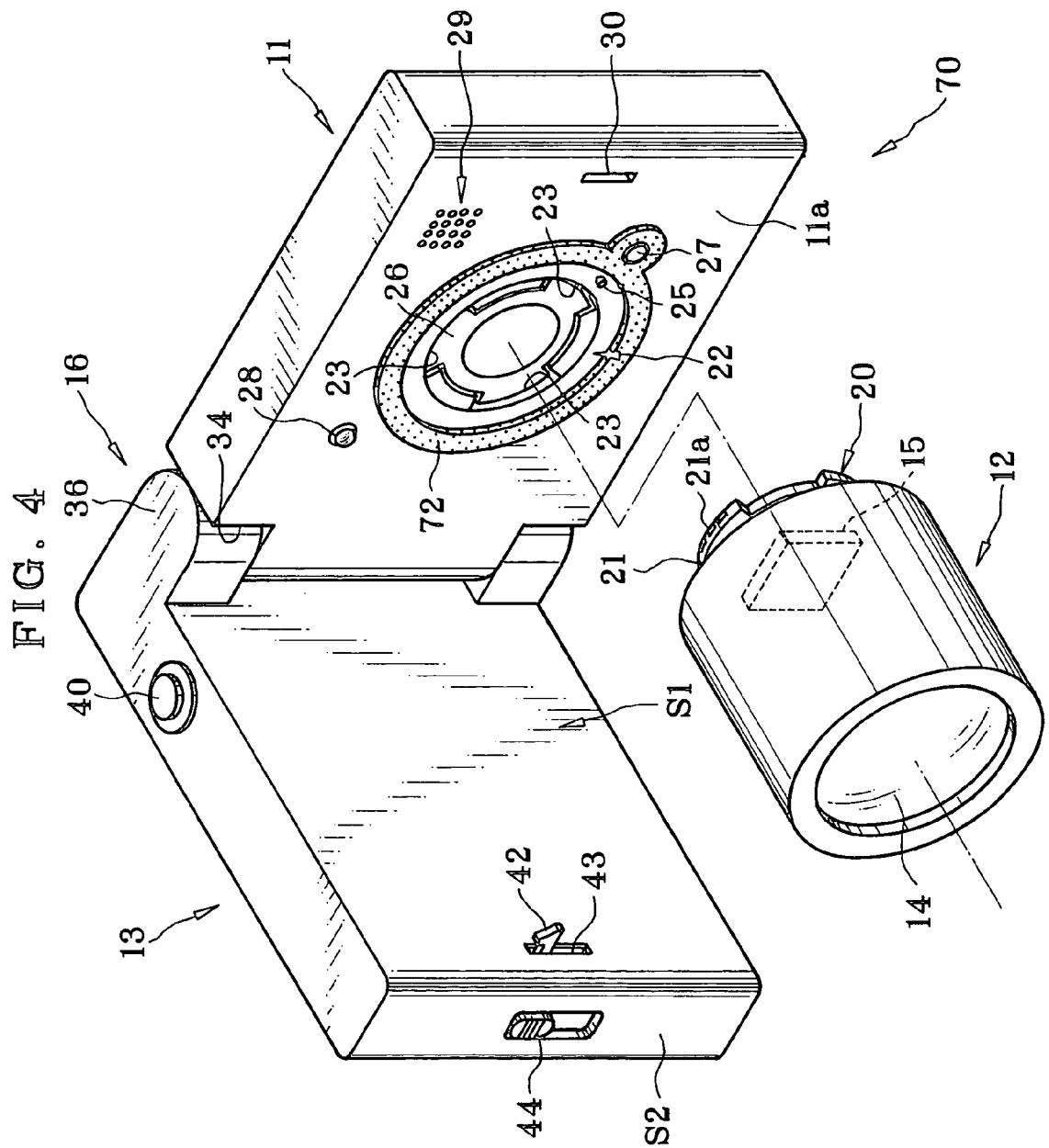
FIG. 4 is a perspective view illustrating another preferred digital still camera in which a flexible pad sheet is in a ring shape.

In FIG. 4, another preferred digital still camera 70 is illustrated. A ring shaped flexible pad sheet 72 as pad material or packing material is disposed about the lens mount mechanism 22 and attached to the front face 11a of the camera body 11. Unlike the above embodiment, the input panel 41 is disposed on a rear race of the camera body 11. When the door shaped cover 13 or grip is in the first position, the pad sheet 72 tightens the contact between the front face 11a and the cover inner surface S1 in a fitted manner. Also, when the lens assembly 12 is coupled with the camera body 11, the pad sheet 72 tightens the contact between the front face 11a and the rear face of the lens assembly 12 in a fitted manner. Therefore, the lens mount mechanism 22 can be protected from liquid, dust or the like in any of the two states including the using state and the preserving state of the digital still camera 10. The pad sheet 72 is kept invisible from a user when squeezed between the camera body 11 and the door shaped cover 13, so the digital still camera 70 can have an agreeable appearance when the door shaped cover 13 is in the first position.

It is preferable to finish the cover inner surface S1 of the door shaped cover 13 or grip in the form of a mirror surface for contact with the pad sheet 72. The form of the mirror surface can tighten the contact with the pad sheet 72, to ensure the property against entry of fluid or dust. Furthermore, it is preferable to keep the door shaped cover 13 rotatable at an angle of 180 degrees about the hinge mechanism 16, so as to set the cover inner surface S1 toward a photographing user. When he or she wishes to take a photograph of a self portrait, framing of his or her image can be determined appropriately because he or she can view the image on the mirror surface of the cover inner surface S1. Note that the mirror surface may be obtained by polishing the surface of the door shaped cover 13, but can be acquired by fitting a separate piece of a reflecting panel of metal or a mirror.

In the above embodiments, the hinge mechanism 16 is disposed at the receiving recess 34 on the right end of the camera body 11 as viewed from a user. When the door shaped cover 13 or grip is in the second position, the door shaped cover 13 extends on the right side of the camera body 11. This is the construction for the right hand use of users. However, the hinge mechanism 16 may be disposed on the left end of the camera body 11 as viewed from a user. When the door shaped cover 13 is in the second position, the door shaped cover 13 may extend on the left side of the camera body 11. In the above embodiment, the pad sheet is attached to only one of the front face 11a and the cover inner surface S1. However, pad sheets may be attached to both of the front face 11a and the cover inner surface S1.

In the above embodiment, the door shaped cover 13 or grip is used as a grip in the second position. However, a shiftable device of the invention may be a cover unlike a grip. Such a cover may be shiftable between a first position to protect the lens mount mechanism 22 and a second position to allow access to the lens mount mechanism 22 in an uncovered manner. Also, an axis about which the cover rotates may extend in any direction distinct from a vertical direction.

In the above embodiment, the lens assembly 12 has a structure in which the CCD image sensor 15 is incorporated. However, the digital still camera 10 may be constructed in any manner known in the field. A camera body may contain the CCD image sensor 15. The lens assembly 12 without a CCD may be removably mounted on the camera body 11 as a digital still camera of an SLR (single lens reflex camera) type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera including a camera body, a lens assembly having a photographing lens, and a lens mount mechanism, positioned on a front face of said camera body, for securing said lens assembly to said camera body removably, said digital camera comprising:
- a cover portion, secured to said camera body, and shiftable between first and second positions while said lens assembly is removed, said cover portion, when in said first position, being opposed to said front face to cover said lens mount mechanism, and when in said second position, being open from said front face to allow loading of said lens assembly;
- a retaining mechanism for retaining said cover portion in said first position;
- a resilient pad material, deformable resiliently when said cover portion is retained in said first position by said retaining mechanism, for tightly closing between said front face and a cover inner surface of said cover portion opposed to said front face.

2. A digital camera as defined in claim 1, wherein said cover portion is a grip portion to operate for externally supporting said camera body during photography.

3. A digital camera as defined in claim 1, further comprising a hinge mechanism for connecting said cover portion with said camera body in a rotatable manner.

4. A digital camera as defined in claim 3, wherein said hinge mechanism has a rotational axis extending vertically.

5. A digital camera as defined in claim 3, wherein said pad material is secured to said cover inner surface.

6. A digital camera as defined in claim 5, wherein said pad material extends in a belt shape and is disposed about said cover portion.

7. A digital camera as defined in claim 5, further comprising an opening, formed through said pad material and positioned inside a peripheral portion of said cover inner surface.

8. A digital camera as defined in claim 5, further comprising an externally operable input unit, disposed on said cover inner surface, positioned inside said opening, for inputting a signal to said camera body.

9. A digital camera as defined in claim 3, wherein said pad material is secured to said front face and offset from said lens mount mechanism.

10. A digital camera as defined in claim 9, wherein said pad material is in a frame shape, has a quadrilateral opening, and is secured to a peripheral edge of said front face.

11. A digital camera as defined in claim 10, further comprising:
- a light source for generating light for signaling; and
- a through hole for passage of sound, said light source and said through hole being formed in said front face and positioned inside said opening of said pad material.

12. A digital camera as defined in claim 9, wherein said pad material is in a ring shape and is secured to said front face about said lens mount mechanism.

13. A digital camera as defined in claim 12, wherein said pad material, when said cover portion is in said second position, is deformed resiliently by contact with said lens assembly.

14. A digital camera as defined in claim 3, wherein said cover inner surface has a form of a mirror surface.

15. A digital camera as defined in claim 3, further comprising:
- a receiving recess formed in said camera body at a first end thereof;
- a projection formed to project from said cover portion at a second end thereof, and inserted in said receiving recess;
- wherein said hinge mechanism keeps said projection rotatable at said receiving recess.

16. A digital camera as defined in claim 1, wherein said lens assembly includes an image pickup device for photoelectric conversion of an image focused by said photographing lens.

17. A digital camera as defined in claim 1, wherein said pad material is formed from rubber or elastomer.

* * * * *